United States Patent [19]

Pond

[11] 3,737,814

[45] June 5, 1973

[54] CRYSTAL FILTER CIRCUIT WITH SHARPLY DEFINED PASSBAND EDGE

[75] Inventor: Charles W. Pond, Costa Mesa, Calif.

[73] Assignee: Hughes Aircraft Company, Culver City, Calif.

[22] Filed: Oct. 6, 1971

[21] Appl. No.: 186,873

[52] U.S. Cl. ..........................333/72, 333/28, 333/75

[51] Int. Cl. ..........................H03h 7/10, H03h 9/00

[58] Field of Search........................333/71, 72, 28, 75

[56] References Cited

UNITED STATES PATENTS

| | | | |
|---|---|---|---|
| 3,344,369 | 9/1967 | Bies et al. | 333/72 |
| 2,738,465 | 3/1956 | Schramm | 333/72 |
| 2,374,735 | 5/1945 | Crosby | 333/72 X |
| 3,569,873 | 3/1971 | Beaver | 333/72 |
| 3,613,032 | 10/1971 | Pond | 333/72 |
| 2,296,882 | 9/1942 | Toth | 333/72 |
| 3,416,104 | 12/1968 | Argoudelis | 333/72 |

*Primary Examiner*—Rudolph V. Rolinec
*Assistant Examiner*—Saxfield Chatmon, Jr.
*Attorney*—W. H. MacAllister, Jr. and Paul M. Coble

[57] ABSTRACT

A crystal filter is disclosed wherein compensation for passband edge rounding due to inherent crystal resistance is afforded using an attenuation equalizer arrangement providing an impedance which caries as a function of frequency such that its magnitude is of a minimum value in the vicinity of the passband edge to be sharply defined. The attenuation equalizer includes a resistive T-network and a crystal resonator having a series resonant frequency approximately equal to the cutoff frequency at the aforementioned passband edge.

7 Claims, 3 Drawing Figures

CRYSTAL FILTER CIRCUIT WITH SHARPLY DEFINED PASSBAND EDGE

This invention relates to crystal filters, and more particularly relates to a crystal filter circuit including an attenuation equalizer arrangement enabling the achievement of an extremely sharp filter passband edge.

In certain crystal filter applications, an attenuation versus frequency passband characteristic is desired in which the passband has at least one very sharply defined bandedge, i.e., the attenuation increases very rapidly as a function of frequency at the edge of the passband. However, the sharpness of crystal filter passband edges are limited by inherent series resistance of the crystals.

In the past crystal filters with sharply defined passband edges have been designed by compensating for inherent crystal resistance using a predistortion design technique. In such a technique the complex frequency transfer function characterizing the behavior of the filter is designed with pole values which differ from the values which they would otherwise possess by amounts which compensate for the crystal losses. However, the predistortion technique is time consuming and laborious to carry out, and it results in highly critical and sensitive circuit element values. Moreover, since crystal filter pole values are a function of the Q of crystal, and crystal Q's may vary significantly from crystal to crystal, the appropriate amount of predistortion compensation is difficult to realize.

A further technique which has been employed in designing crystal filters with sharply defined passband edges involves the trial and error selection of filter component values using an optimizing computer routine. However, this method suffers from the same drawbacks as those set forth above with respect to the predistortion design technique.

Accordingly, it is an object of the present invention to provide a crystal filter circuit having at least one sharply defined passband edge, and which circuit can be designed more quickly and readily than comparable crystal filter circuits of the prior art.

It is a further object of the present invention to provide a crystal filter circuit with a sharply defined bandedge in which the component values are of reduced sensitivity and criticality.

It is still another object of the invention to provide a sharply defined bandedge crystal filter which is relatively insensitive to variations in crystal Q.

A crystal filter circuit according to the invention includes a transformer having a primary winding coupled between first and second terminals. A first capacitor is coupled in parallel with the transformer secondary winding, while first and second crystal resonators having respective series resonant frequencies selected to provide a desired filter passband are coupled in series with one another and in parallel with the secondary winding. An inductor and a second capacitor are coupled in parallel between the second terminal and a junction point between the crystal resonators. An attenuation equalizer arrangement including a resistive element and a frequency sensitive element is coupled between the junction point and a third terminal. The attenuation equalizer arrangement provides an impedance which varies as a function of frequency such that the magnitude of the impedance is of a minimum value in the vicinity of an edge of the filter passband, thereby achieving a sharply defined passband edge.

Additional objects, advantages and characteristics features of the present invention will become readily apparent from the following detailed description of a preferred embodiment of the invention when considered in conjunction with the accompanying drawing wherein.

Figure 1:
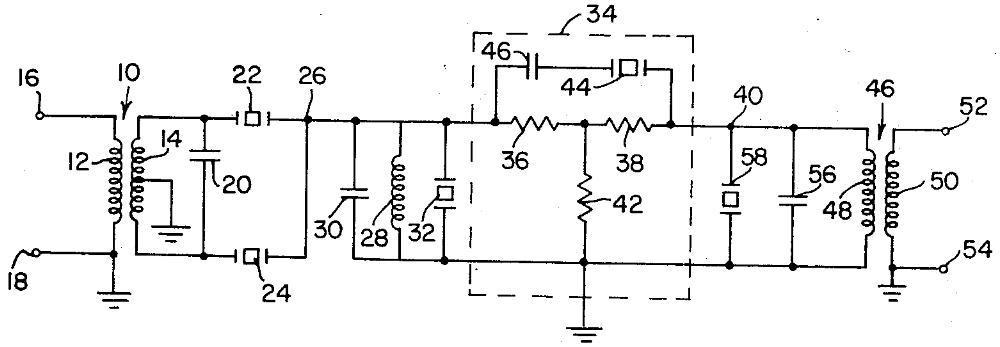
FIG. 1 is a schematic circuit diagram illustrating a crystal filter circuit according to the invention.

Referring to FIG. 1 with greater particularity, a crystal filter circuit in accordance with the invention may be seen to include a phase inverting input transformer 10 having a primary winding 12 and a secondary winding 14. The secondary winding 14 has a center tap connected to a level of reference potential illustrated as ground in FIG. 1. The primary winding 12 is connected between a pair of input terminals 16 and 18 for the circuit, the terminal 18 being shown as connected to ground. A capacitor 20 is connected in parallel with transformer secondary winding 14, while respective crystal resonators 22 and 24 are connected between the respective ends of the secondary winding 14 and a junction point 26.

The series resonant frequencies of the crystal resonators 22 and 24 are selected to provide the desired filter passband in accordance with a selected filter design. Specifically, when it is desired that the crystal filter of FIG. 1 be of intermediate band design, one of the crystal resonators 22 or 24 is made to have a series resonant frequency at a frequency in the vicinity of the lower edge of the frequency passband of the filter and at which frequency the attenuation provided by the filter is a predetermined amount (for example, 3 db) above its minimum attenuation level, while the series resonant frequency of the other crystal resonator 22 or 24 is made to occur at a frequency which provides the same level of attenuation (3 db above minimum level) but in the vicinity of the upper edge of the filter passband. For a narrow band filter design, one of the crystal resonators 22 or 24 is made to have a series resonant frequency near the lower passband edge where a predetermined amount of attenuation (for example, 3 db) above minimum attenuation is provided, while the other crystal resonator 22 or 24 is made to have a series resonant frequency at approximately the center frequency of the filter passband. For a wide band filter design, one of the crystal resonators 22 or 24 is made to have a series resonant frequency above the lower edge of the filter passband by a predetermined amount (for example, one-fourth of the filter bandwidth), while the other crystal resonator 22 or 24 is made to have a series resonant frequency below the upper edge of the filter passband by essentially the same amount (i.e., one-fourth of the filter bandwidth).

An inductor 28 and a capacitor 30 are connected in parallel between junction point 26 and ground to form a tank circuit which is tuned to approximately the center frequency of the filter passband. A band reject crystal resonator 32 may be connected in parallel with inductor 28 and capacitor 30 to enhance the sharpness of the associated passband edge. Crystal resonator 32 is made to have a series resonant frequency essentially equal to the frequency at which attenuation is to be introduced so as to present an effective short circuit (minimum impedance) to signals at this frequency. As a specific example, when providing a sharply defined passband edge at the lower extremity of the filter passband, crystal resonator 32 would be designed to have a series resonant frequency slightly below the lower cutoff frequency of the filter passband.

In order to compensate for inherent series resistance of the crystals used to define the filter passband and thereby achieve a sharply defined passband edge, a crystal filter in accordance with the invention is provided with an attenuation equalizer arrangement illustrated within dashed lines 34 of FIG. 1. The attenuation equalizer 34 provides an impedance which varies as a function of frequency such that its magnitude is of a minimum value at a frequency in the vicinity of the passband edge to be sharply defined.

In the embodiment illustrated in FIG. 1, the attenuation equalizer 34 includes first and second resistors 36 and 38 coupled in series between junction point 26 and a junction point 40, and a third resistor 42 coupled between the junction between resistors 36 and 38 and the ground level. The attenuation equalizer 34 also includes a crystal resonator 44 coupled between junction points 26 and 40 in parallel with series resistors 36 and 38. The crystal resonator 44 is designed to have a series resonant frequency approximately equal to the passband cutoff frequency at the edge of the passband it is desired to make sharply defined. As a specific example, for a sharply defined passband edge at the lower extremity of the filter passband, the crystal resonator 44 may have a series resonant frequency just above the lower cutoff frequency of the filter passband. Moreover, in order to enable fine tuning of the series resonant frequency of the crystal resonator 44 and thereby readily compensate for inherent differences between individual crystals, a tuning capacitor 46 is preferably coupled in series with the crystal resonator 44 between the junction points 26 and 40.

In order to develop output signals from the crystal filter of FIG. 1, an impedance matching output transformer 46 has its primary winding 48 coupled between junction point 40 and the ground level. Secondary winding 50 of transformer 46 is coupled between a pair of output terminals 52 and 54, the terminal 54 being shown as connected to ground. A tuning capacitor 56 may be connected in parallel with transformer primary winding 48 to provide a tank circuit tuned to approximately the center frequency of the filter passband. Moreover, in order to further enhance the sharpness of the filter passband edge in question, a crystal resonator 58 may be connected in parallel with capacitor 56. Crystal resonator 58 is made to have a series resonant frequency in the vicinity of the appropriate filter passband cutoff frequency (e.g., the lower cutoff frequency) and functions in the manner discussed above with respect to crystal resonator 32 to present an effective short circuit to signals at essentially this cutoff frequency.

Figure 2:
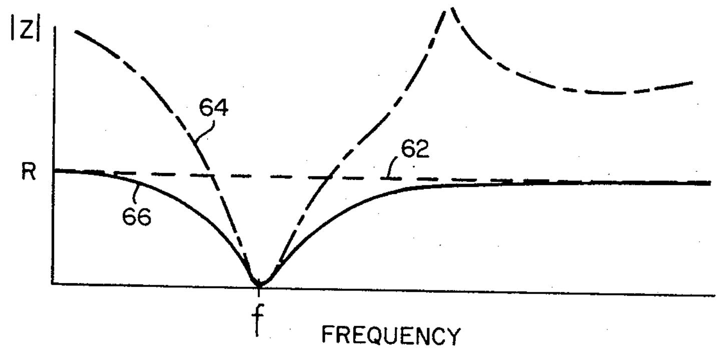
FIG. 2 is a graph illustrating the magnitude of the impedance of portions of the circuit of FIG. 1 as a function of frequency.

The impedance provided by the attenuation equalizer 34 and component portions thereof as a function of frequency is illustrated in FIG. 2. As shown by dashed line 62, resistors 36, 38 and 42 provide a resistance R between junction points 26 and 40 over the entire frequency range of interest. The value of resistance R is selected to provide an amount of attenuation essentially equal in magnitude to the difference between the minimum passband attenuation level and the attenuation level at the passband cutoff frequency in question in the absence of attenuation equalizer portion 34.

The impedance provided by crystal resonator 44 and capacitor 46 between junction points 26 and 40 is illustrated by curve 64 of FIG. 2. It may be seen from curve 64 that the crystal resonator 44 provides a minimum impedance at the series resonant frequency $f$ of the resonator 44 and a very high impedance at frequencies far removed from the resonant frequency $f$.

The overall impedance provided by the attenuation equalizer 34 between junction points 26 and 40 is illustrated by curve 66 of FIG. 2. It may be seen from curve 66 that at frequencies far removed from the series resonant frequency $f$ of the crystal resonator 44 the impedance of the crystal resonator 44 is sufficiently high so that the overall impedance presented by the attenuation equalizer 34 between points 26 and 40 is essentially equal to the resistance R. However, at and adjacent to the resonant frequency $f$ the impedance of the crystal resonator 44 is sufficiently small so as to significantly reduce the overall impedance of the attenuation equalizer 34. Since the resonant frequency $f$ of the crystal resonator 44 is made to occur essentially at the passband edge to be sharply defined, compensation is provided for inherent resistance in crystal resonators 22 and 24 which would otherwise produce a rounding of the passband edge.

Figure 3:
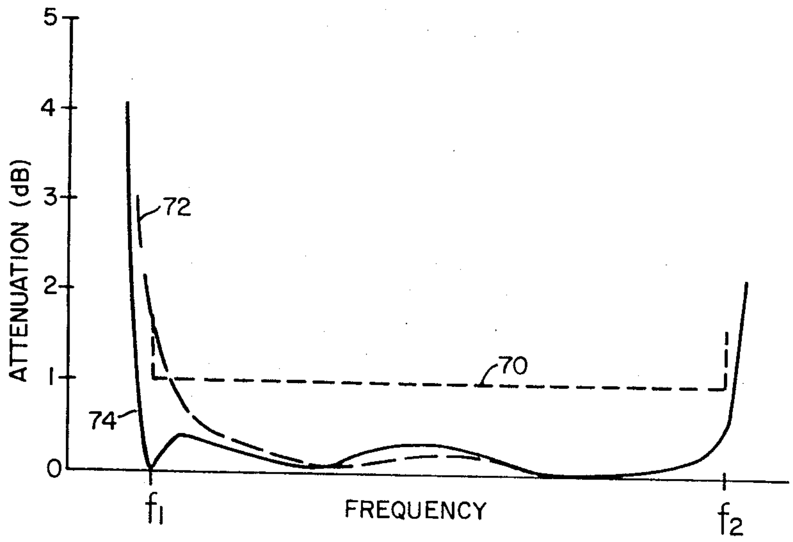
FIG. 3 is a graph showing the attenuation versus frequency characteristic of the circuit of FIG. 1 both with and without an attenuation equalizer arrangement.

The function of the attenuation equalizer arrangement 34 is further illustrated by the attenuation versus frequency curves of FIG. 3. In this figure dashed line 70 illustrates an exemplary design specification limit for a crystal filter according to the invention. The specification limit 70 requires that the filter provide a level of attenuation below a specified level (illustrated as 1 db) throughout a passband extending from a lower cutoff frequency $f_1$ to an upper cutoff frequency $f_2$. Curve 72 illustrates the attenuation versus frequency characteristic for the circuit of FIG. 1 without the attenuation equalizer portion 34. It may be seen from curve 72 that as the frequency decreases from the vicinity of the center of the filter passband toward the lower cutoff frequency $f_1$, the attenuation increases gradually and at the lower cutoff frequency $f_1$ actually exceeds the design specification limit by around 0.5 db.

Curve 74 illustrates the attenuation versus frequency characteristic for the circuit of FIG. 1 including the attenuation equalizer 34. As was explained above with reference to FIG. 2, the attenuation equalizer 34 introduces a frequency sensitive impedance which effectively affords minimum loss at the resonant frequency $f$ of the crystal resonator 44. Since the resonant frequency $f$ is approximately equal to the filter lower cutoff frequency $f_1$, the overall attenuation versus frequency characteristic 74 for the filter circuit of FIG. 1 is caused to have an attenuation minima at the frequency $f_1$. Thus, a sharply defined passband edge is provided adjacent the cutoff frequency $f_1$, along with an attenuation level at the frequency $f_1$ well below the design specification limit 70.

In the specific exemplary circuit described above, the series resonant frequency f of the crystal resonator 44 was indicated to be approximately equal to the filter lower cutoff frequency $f_1$ so as to provide a sharply defined passband edge adjacent the frequency $f_1$. It should be apparent, however, that the circuit could be designed to provide a sharply defined passband edge adjacent the upper cutoff frequency $f_2$ by making the series resonant frequency of the crystal resonator 44 approximately equal to the frequency $f_2$. Or, sharply defined passband edges at both the lower cutoff frequency $f_1$ and the upper cutoff frequency $f_2$ may be afforded by coupling an additional crystal resonator in parallel with crystal resonator 44 between junction points 26 and 40 and making the series resonant frequency of this additional crystal resonator approximately equal to the filter upper cutoff frequency $f_2$.

Thus, although the invention has been shown and described with reference to a particular embodiment, nevertheless, various changes and modifications obvious to a person skilled in the art to which the invention pertains are deemed to lie within the spirit, scope and contemplation of the invention.

What is claimed is:

1. A crystal filter circuit comprising:

a transformer having a primary winding and a secondary winding, said primary winding being coupled between first and second terminals; a first capacitor coupled in parallel with said secondary winding, first and second crystal resonators coupled in series with one another and in parallel with said secondary winding, said crystal resonators having respective series resonant frequencies selected to provide a desired filter passband; an inductor and a second capacitor coupled in parallel between said second terminal and a junction point between said first and second crystal resonators; and attenuation equalizer means including resistive means and frequency sensitive means coupled between said junction point and a third terminal for providing an impedance therebetween which varies as a function of frequency such that the magnitude of said impedance is of a minimum value in the vicinity of an edge of said filter passband.

2. A crystal filter circuit according to claim 1 wherein said attenuation equalizer means includes a resistor and a crystal resonator coupled in parallel between said junction point and said third terminal, said crystal resonator having a series resonant frequency approximately equal to a frequency at said edge of said filter passband.

3. A crystal filter circuit according to claim 2 wherein said series resonant frequency of said crystal resonator of said attenuation equilizer means is approximately equal to the lower cutoff frequency of said filter passband.

4. A crystal filter circuit according to claim 2 wherein a capacitor is coupled in series with said crystal resonator of said attenuation equilizer means between said junction point and said third terminal.

5. A crystal filter circuit according to claim 1 wherein said attenuation equalizer means includes first and second resistors coupled in series between said junction point and said third terminal, a third resistor coupled between said second terminal and the junction between said first and second resistors, and a crystal resonator coupled between said junction point and said third terminal in parallel with said first and second resistors, said crystal resonator having a series resonant frequency approximately equal to a frequency at said edge of said filter passband.

6. A crystal filter circuit comprising:

a first transformer having a primary winding and a secondary winding, said primary winding being coupled between first and second terminals; a first capacitor coupled in parallel with said secondary winding; first and second crystal resonators coupled in series with one another and in parallel with said secondary winding, said crystal resonators having respective series resonant frequencies selected to provide a desired filter passband; an inductor and a second capacitor coupled in parallel between said second terminal and a first junction point between said first and second crystal resonators;

first and second resistors coupled in series between said first junction point and a second junction point; a third resistor coupled between said second terminal and the junction between said first and second resistors; a third crystal resonator and a third capacitor coupled in series between said first and second junction points in parallel with said first and second resistors, said third crystal resonator having a series resonant frequency equal to a frequency in the vicinity of an edge of said filter passband;

a second transformer having a primary winding and a secondary winding, said primary winding of said second transformer being coupled between said second terminal and said second junction point, said secondary winding of said second transformer being coupled between said second terminal and a third terminal; and a fourth capacitor coupled in parallel with said primary winding of said second transformer.

7. A crystal filter circuit according to claim 6 wherein a fourth crystal resonator is coupled in parallel with said second capacitor and a fifth crystal resonator is coupled in parallel with said fourth capacitor, each of said fourth and fifth crystal resonators having a series resonant frequency equal to a frequency in the vicinity of said edge of said filter passband.

* * * * *